(12) United States Patent
Masse et al.

(10) Patent No.: US 10,900,522 B2
(45) Date of Patent: Jan. 26, 2021

(54) SELF-LUBRICATING COMPOSITE FRICTION PART

(71) Applicant: HYDROMECANIQUE ET FROTTEMENT, Andrezieux Boutheon (FR)

(72) Inventors: Emmanuel Masse, Feurs (FR); Olivier Blandenet, Meylan (FR)

(73) Assignee: HYDROMECANIQUE ET FROTTEMENT, Andrezieux-Boutheon (FR)

( * ) Notice: Subject to any disclaimer, the term of this patent is extended or adjusted under 35 U.S.C. 154(b) by 396 days.

(21) Appl. No.: 15/325,447

(22) PCT Filed: Jun. 29, 2015

(86) PCT No.: PCT/FR2015/051765
§ 371 (c)(1),
(2) Date: Jan. 11, 2017

(87) PCT Pub. No.: WO2016/009124
PCT Pub. Date: Jan. 21, 2016

(65) Prior Publication Data
US 2017/0175812 A1    Jun. 22, 2017

(30) Foreign Application Priority Data
Jul. 16, 2014 (FR) ..................................... 14 56836

(51) Int. Cl.
*F16C 33/20* (2006.01)
*F16C 17/02* (2006.01)
(Continued)

(52) U.S. Cl.
CPC ............ *F16C 33/208* (2013.01); *F16C 17/02* (2013.01); *F16C 29/02* (2013.01); *F16C 17/243* (2013.01);
(Continued)

(58) Field of Classification Search
USPC ..... 442/226, 238; 384/300, 298; 29/898.059
See application file for complete search history.

(56) References Cited

U.S. PATENT DOCUMENTS 2,804,886 A    9/1957   White
3,804,479 A    4/1974   Butzow et al.
(Continued)

FOREIGN PATENT DOCUMENTS

DE    199 15 348 A     10/2000
FR    2 997 146 A1     4/2014
(Continued)

OTHER PUBLICATIONS

International Search Report, dated Oct. 16, 2015, from corresponding PCT application.
(Continued)

*Primary Examiner* — Lynda Salvatore
(74) *Attorney, Agent, or Firm* — Nixon & Vanderhye

(57) ABSTRACT

Disclosed is a self-lubricating composite friction part (1) that can be subjected, during operation, to temperatures that are at least equal to 250° C. The part includes, along the friction surface (2), a single layer of a material consisting of weft and warp yarns made of polytetrafluoroethylene, the material being impregnated with a thermostable resin having a glass transition temperature that is at least equal to 250° C. It is applied to a reinforcing layer (3).

17 Claims, 1 Drawing Sheet

(51) Int. Cl.
*F16C 29/02* (2006.01)
*F16C 17/24* (2006.01)
(52) U.S. Cl.
CPC ...... *F16C 2208/32* (2013.01); *F16C 2208/40* (2013.01); *F16C 2208/82* (2013.01); *F16C 2220/08* (2013.01); *F16C 2220/28* (2013.01)

(56) References Cited

U.S. PATENT DOCUMENTS

| | | | |
|---|---|---|---|
| 3,825,982 | A | 7/1974 | De Lavalette et al. |
| 4,006,051 | A * | 2/1977 | Board, Jr. ............. F16C 33/201 156/247 |
| 4,111,499 | A * | 9/1978 | McCloskey ........... F16C 23/045 384/192 |
| 4,666,318 | A | 5/1987 | Harrison |
| 5,952,067 | A | 9/1999 | Head |
| 6,264,369 | B1 | 7/2001 | Mesing et al. |
| 2016/0061267 | A1 | 3/2016 | Masse et al. |

FOREIGN PATENT DOCUMENTS

| | | |
|---|---|---|
| GB | 1156165 A | 6/1969 |
| GB | 1 439 030 A | 6/1976 |
| JP | S53-68341 A | 6/1978 |
| JP | S57-163726 A | 10/1982 |
| JP | S59-3259 B2 | 1/1984 |
| JP | 4-25669 A | 1/1992 |
| JP | 2005-220486 A | 8/2005 |
| JP | 2011-190561 A | 9/2011 |

OTHER PUBLICATIONS

Daniel A. Scola, "Polyimide resins", 2012, Retrieved from the internet: URL:http://polycomp.mse.iastate.edu/files/2012/01/7-Polyimide-Resins.pdf.
Office Action in Japanese Patent Application No. 2017-502265 dated Apr. 2, 2018 with English translation provided.
Office Action in Japanese Patent Application No. 2017-502265 dated Feb. 4, 2019 with English translation provided.
Office Action in Korean Patent Application No. 10-2017-7003919 dated Jun. 15, 2018 with English translation provided.
Office Action issued in European Patent Application No. 15 742 354 dated Mar. 17, 2020 with partial English translation provided.

* cited by examiner

SELF-LUBRICATING COMPOSITE FRICTION PART

The invention relates to a self-lubricating composite friction part intended for applications without utilizing lubricant between this part and an opposing part, therefore having a low coefficient of friction with the latter, and/or involving temperatures greater than 250° C. and capable of ranging up to 300° C., or even peaking at 320° C. Such a friction part can be in particular a joint or a slide.

In order to satisfy this type of constraint, it has already been proposed to cover the surface of the mechanical part with linings impregnated with a resin forming a matrix, but these coverings do not make it possible to obtain a low coefficient of friction combined with a good performance at high temperatures.

Thus, document GB-1 439 030 describes a friction covering, in particular for a bearing, comprising a friction layer formed of a weaving of adjacent cords formed by strands with a low coefficient of friction containing a fluorocarbon-containing resin; the surface of these cords has irregularities, with raised and depressed portions, and the strands and the cords are embedded in a plastic material. The strands are formed by fibres made of a material such as PTFE, which does not chemically bond to any plastic material; these fibres are however anchored in the abovementioned covering; the PTFE fibres can be mixed with strands of cotton. In the example described, the fabric extends helically being bordered by a helical assembly of glass fibres; the assembly is embedded in an epoxy or polyester resin. The layer formed by glass fibres is thicker than the layer formed by PTFE strands. In particular due to the nature of the resin used as matrix, it is understood that such a covering when in operation can barely withstand temperatures of 200° C.

Also, it has been envisaged, in document JP-H0425669, to activate the surface of PTFE fibres so as to secure the fibres within a matrix in which these fibres are mixed at a concentration which is barely 5% at most. Such a configuration moreover does not make it possible to obtain a good mechanical performance, at high temperature, with a low coefficient of friction.

Repeating certain teachings from document U.S. Pat. No. 2,804,886, document U.S. Pat. No. 3,804,479 proposes another type of friction layer which contains filaments of Teflon® and adherent filaments of Dacron® which are woven sufficiently loosely to allow good impregnation by a liquid resin; this layer is bordered by a winding of the strips impregnated with a resin and loaded with glass fibres. The presence of the adherent filaments in a material such as Dacron® means that in operation the covering cannot withstand temperatures of 200° C. or higher.

Document U.S. Pat. No. 4,666,318 discloses a self-lubricating covering intended for very specific applications in the aeronautical field (low pressure and low amplitudes), formed by a plastic material containing PTFE, co-operating with an opposing part having a roughness which is not greater than 0.050 microns CLA and a hardness of not less than 1000 VPN.

It is understood that the determination of a friction covering combining a low coefficient of friction, a good mechanical performance (in particular a good tearing strength), and the ability to retain good friction and mechanical properties up to operating temperatures comprised between 250° C. and 300° C. (or even up to 320° C. in transient operation) means being able, under industrially acceptable conditions and at a reasonable cost, to combine a resin retaining a good mechanical performance above 250° C. while exhibiting a satisfactory adherence, including above this temperature threshold, with lining elements having a particularly low coefficient, therefore a priori not very adherent to this resin.

An object of the invention is to meet this need.

To this end, the invention proposes a self-lubricating composite friction part being able to be subjected in operation to temperatures at least equal to 250° C., comprising, along the friction surface, a single layer of a fabric formed by weft and warp strands of polytetrafluoroethylene, this fabric being impregnated with a heat-stable resin having a glass transition temperature at least equal to 250° C.

It may be noted that, unlike the solutions already proposed, the invention teaches the utilization of a single layer of a fabric, the warp strands and the weft strands of which are all made of polytetrafluoroethylene (PTFE). Thus, the invention recommends increasing the section of the strands constituting the fabric (where the more recent known solutions tended to envisage several thin layers), so as to promote a good anchoring by the resin and to only use strands of PTFE where the more recent known solutions tended to combine in one and the same fabric, strands of PTFE with different strands, having a better adherence with the resin. In fact, it appears that the fact of utilizing, in the layer protecting the surface of the part, only a single layer of fabric of PTFE has the advantage of increasing the tearing strength, given the continuity of the strands throughout the thickness of this protective layer, while promoting a good anchoring of this layer in the resin owing to the spaces remaining between the strands of the fabric.

It can be said that such a fabric is self-lubricating.

According to advantageous characteristics of the invention:

- The fabric is a weave formed by crossings of pairs of weft strands and of pairs of warp strands; it can in particular be a 2/2 twill,
- The weft strands or the warp strands are formed by short fibres linked to one another,
- The fabric has a thickness of at least 0.10 mm, advantageously at least 0.30 mm, preferentially at least 0.50 mm,
- The weft strands and the warp strands have a count of at least 100 dtex, preferentially at least 400 dtex,
- The resin is a thermosetting polyimide,
- The part also comprises a reinforcing layer bordering the fabric opposite the friction surface, this reinforcing layer being impregnated with the same resin as the fabric,
- The part constitutes a bearing or a guide rail, among various possible applications.

The product of the invention appears to have the advantage of being self-lubricating in operation, at temperatures greater than 250° C., which can range up to 300° C. continuously, or even peak at 320° C., while having a very low coefficient of friction (comprised between 0.01 and 0.2) equivalent to that of untreated PTFE (without additive or without lining) but resistant to loads greater than 40 N/mm$^2$.

By analogy, the invention proposes a method for the manufacture of a self-lubricating composite friction part of the abovementioned type according to which a layer of fabric is formed by the helical winding of a strip of fabric formed by weft strands and warp strands, all constituted by polytetrafluoroethylene, on a mandrel according to a winding angle such that the strip comes edge-to-edge with itself after each turn, the fabric is impregnated with a heat-stable resin having a glass transition temperature of at least 250° C. This resin is advantageously a thermosetting polyimide.

Objects, characteristics and advantages of the invention will become apparent from the description which follows, given by way of non-limitative illustrative example, with reference to the attached drawings in which.

A friction part according to the invention essentially comprises a friction layer having a free surface S intended to be opposite an opposing part; advantageously, this friction part also comprises a reinforcing layer bordering the friction layer opposite the friction surface in order to strengthen the mechanical performance of this layer.

Figure 1:
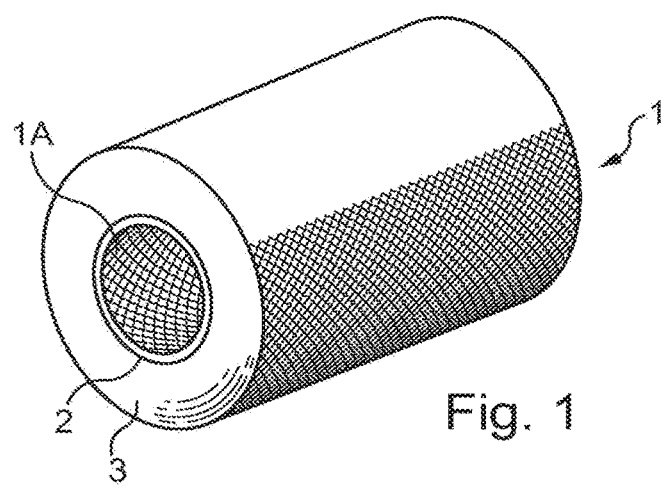
FIG. 1 is a perspective view of a friction part according to the invention.

In the example of FIG. 1, the friction part is a bearing 1 intended to receive, in its longitudinal bore 1A, a shaft (not shown). In a variant, it can also be a slide receiving a rod in translational motion. The friction layer which borders the friction surface (therefore the internal surface) is denoted by the reference 2, while the reinforcing layer is denoted by the reference 3. This layer 3 here has a thickness substantially greater than that of the friction layer; in fact, the friction layer in practice has a thickness of the order at most a few millimetres (no more than 3 mm in practice) while the reinforcing layer can be several millimetres, or even a few centimetres in thickness, depending on requirements. However, it goes without saying that the reinforcing layer, when it exists, can have any relative thickness with respect to the friction layer.

The function of the friction layer is to guide, with the least possible friction, the opposing part which is the abovementioned shaft while retaining its physical integrity in operation, for as long as possible, including at operating temperatures of at least 250° C. continuously, and peaking above 300° C. (for example up to of the order of 320° C.).

In order to do this, the friction layer consists of a single layer of a fabric of strands made of coated polytetrafluoroethylene (or PTFE) in a matrix formed by a heat-stable resin having a glass transition temperature greater than the maximum continuous operating temperature, therefore of at least 250° C., or even as close as possible to 300° C.

The concept of polytetrafluoroethylene or PTFE denotes here the various forms of this compound, including the expanded version known as "ePTFE".

The weave of the fabric, i.e. the relative configuration of the strands constituting this fabric, is selected so as to form, between the various strands, flow channels that can be filled with the heat-stable resin. In fact it is understood that, as the PTFE has practically no adherence with the other materials, the anchoring of the fabric in the matrix can only be done by entangling the irregular filaments constituted by the resin filling the various flow channels existing through the fabric, which filaments are connected along the strands of PTFE close to the friction surface.

It is understood that a compromise, depending on the applications, is to be found regarding the section and the number of the resin flow channels through the fabric; the more numerous and the wider these flow channels, the better the anchoring of the strands in the PTFE, but the lower the fraction of the friction surface which is formed by strands of PTFE. Conversely, the greater the fraction of friction surface formed of strands in PTFE, the better the friction behaviour of the friction part, but the weaker the anchoring of the fabric in the matrix.

It appears desirable that there is a flow channel for the resin at each crossing of the weft strands and the warp strands.

Among the common weaves, it appears that a twill, and more precisely a 2/2 twill formed by the interweaving of pairs of weft strands and pairs of warp strands, allows the constitution, between the strands of a network, of channels filled with resin which is sufficiently dense to ensure a good anchoring of the fabric despite the absence of adherence between the strands and the resin, while giving the opposing part a significant surface formed by PTFE.

Figure 2:
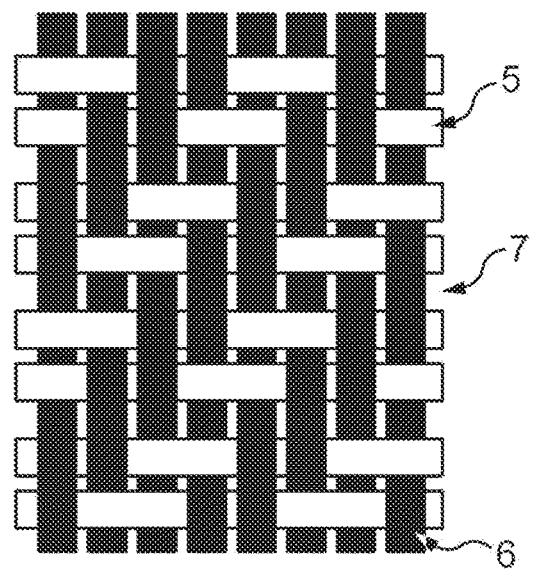
FIG. 2 is a view of a preferred example of weaving the friction layer of this friction part.
Figure 3:
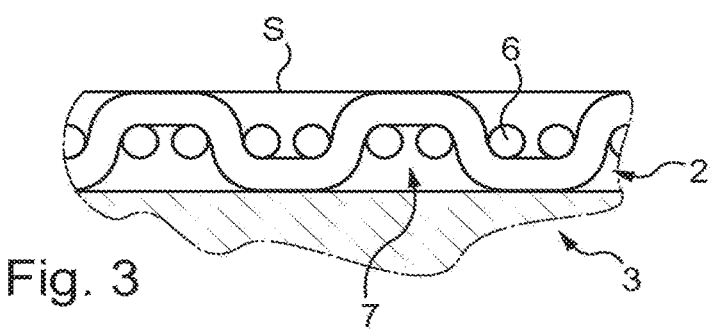
FIG. 3 is a cross-sectional view of this friction layer bordered by a reinforcing layer.

Such a 2/2 twill is shown in FIGS. 2 and 3, where weft strands are denoted by the reference 5 and warp strands are denoted by the reference 6, leaving the interstices 7 free for the resin to pass through, subject to the weaving not being too tight. Good results have been obtained with a 2/2 twill.

Yet more advantageously, the weft and warp strands are each formed by a single filament formed by PTFE fibres linked to each other by twisting, which means that the filaments, and therefore the weft and warp strands, have an irregular surface which contributes to the good anchoring of the fabric in the matrix.

Good results have been obtained with such a weaving of monofilaments formed by fibres with an average diameter of 0.1 to 0.14 mm.

These fibres preferably have a count of more than 400 dtex; advantageously at least 750 dtex; very satisfactory tests have been obtained with fibres of 833 dtex.

In a variant, the fabric is formed by strands each formed by several filaments, continuous or formed by short fibres as in the abovementioned example; in such a case, the count of the filaments can be lower, for example of the order of 350 to 450 dtex for bifilament strands, or even less. The weaving can be done by assembling strands of two or three pieces, with or without twisting.

According to yet another variant, the surface of the filaments is deliberately rendered irregular, for example by the formation of micro-notches.

The thickness of the fabric is at least 0.30 mm, or even at least 0.5 mm; values ranging beyond one millimetre can be envisaged; this makes it possible to determine the section of the strands to be used. The weft strands and the warp strands are advantageously identical. Their section is, in the example considered in FIGS. 2 and 3, that of a disc. In a variant which is not shown, this section is rectangular, with for example a form factor (ratio between the largest dimension and the smallest dimension) which is preferably at least 2.

The heat-stable resin is advantageously selected from the thermosetting polyimides, the resins based on cyanate ester or from the polyetherketones (polyetheretherketone—PEEK, or polyetherketoneketone—PEKK, in particular). These resins have at minimum glass transition temperatures greater than 280° C. Among the thermosetting polyimides, the polybismaleimides—or BMI—can be mentioned.

It does not appear to be useful to incorporate a filler into the heat-stable resin.

As the reinforcing layer, when it exists, has the function of forcing the friction layer to retain its shape despite the pressure applied between the friction part and the opposing part, including at high temperature, it is understood that it is advantageous for this reinforcing layer to be constituted by a material having a very low thermal expansion coefficient, typically at most equal to $13.10^{-6}$ $K^{-1}$ (corresponding to steel); it is within the scope of a person skilled in the art to define the geometry and the constitution of this reinforcing layer as a function of requirements. It can in particular comprise strands or fibres of carbon, glass or aramide, free or combined in a fabric (sometimes referred to as roving).

The fabric of the friction layer is advantageously available as a strip, which confers a great freedom for shaping the friction layer by using, if necessary, a preform the profile of which is the negative of the form of the friction surface to be obtained. The width of the strip can be selected as a function of requirements; it is advantageously selected between 5 mm and 2 m, for example between 1 cm and 10 cm, preferably between 1.5 cm and 3 cm.

Figure 4:
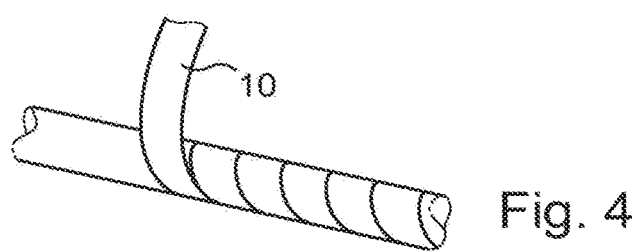
FIG. 4 is a simplified diagram of the method of formation of a friction part such as that of FIGS. 1 to 3.

In the abovementioned case where the friction part is a bearing, its manufacture can start by winding such a strip of fabric around a mandrel the external diameter of which is equal to the internal diameter of the bearing to be produced; the strip is wound helically so as to ensure an edge-to-edge contact of the successive turns formed on the mandrel (see FIG. 4). It is understood that the width of the strip 10 determines the inclination of the weft strands and the warp strands with respect to the axis of the mandrel and therefore of the future bearing. In fact, the weft strands and the warp strands are arranged longitudinally and transversally to the strip of fabric, respectively.

It is understood that a continuity of both the weft strands and warp strands in the friction layer contributes to the preservation of a good integrity during the operating life of the bearing; for these strands, an inclination of 40° to 60° with respect to the longitudinal axis of the bearing appears to be favourable for this. In the case of an edge-to-edge winding and furthermore for a fabric (and not for a strand), it is preferable to have a winding following an angle comprised between 65° and 89°.

The reinforcing layer can be formed by winding a strand of carbon or glass, or any other appropriate material with what can be, apparently, any angle of inclination. In the case of windings of strands, the optimum angle appears to be comprised between 40° and 60°, but this angle can vary depending on the applications and the desired mechanical characteristics.

The strip of fabric on the one hand, and the strand of the reinforcing layer on the other hand, are advantageously impregnated beforehand with a heat-stable resin; however it is understood that, if the reinforcing layer is formed using the same resin as for the friction layer, a subsequent heat treatment can help to firmly attach the matrices to one another.

Instead of being formed by a winding of a strip, as a variant the PTFE fabric is constituted by a braided tubular sleeve.

It is easily understood that, for a friction part of the slide type, the friction layer can be simply formed by attaching the abovementioned fabric to an underlying reinforcing layer.

By way of example, a friction bearing was formed in the following manner.

A PTFE fabric with a thickness of 0.3 mm was selected with a 2/2 twill weave, in the form of a strip with a width of 3 cm. This strip was immersed in an impregnation bath, maintained at 110° C., containing a heat-stable resin of polybismaleimide (BMI) type having a glass transition temperature of 285° C.

This impregnated strip was wound onto a mandrel, taking care to cover the entire surface of the mandrel without any overlapping between the successive turns, i.e. so as to form a single continuous layer over the entire surface of the mandrel which was intended to form a bearing (or a plurality of bearings). Advantageously, the mandrel was itself also maintained at the temperature of the impregnation bath.

A strand of epoxy glass impregnated beforehand with the same resin (referred to as glass filament of the roving type) was then wound.

The polymerization cycle followed comprised treatment for 4 hours (a longer duration is possible) at 170° C., demoulding, and an additional curing treatment for 4 hours (a longer duration is possible) at a temperature comprised between 230° C. and 250° C.

It has been noted that it was difficult to cut the PTFE fibres during subsequent machining, which confirms the good performance with regard to wear of the assembly.

Tribological tests were carried out under the following conditions:
Oscillation of the axis of amplitude: 100°.
Projected pressure: 80 MPa.
Average velocity: 8 mm/s
Average PV (pressure×velocity): 0.64 MPa·m/s.
Initial shaft/bearing clearance: between 0.1 and 0.2 mm.
Dimensions of bearing: Øint 30×Øext 36×Lg 20.
Initial greasing: None
Opposing shaft of the solutions tested: 16 NC 6 case-hardened
Maximum duration of test: 1 month (350,000 cycles)
Ambient temperature While an increase in the coefficient of friction was noted with a known bearing (formed from a polyester fabric coated with a resin loaded with PTFE, or from a fabric formed by strands of polyester and strands of PTFE with less than 50% maximum of PTFE), up to 0.04, or even 0.08, the coefficient of friction for the bearing of the invention appears to remain substantially constant at a value of barely 0.02 up to 350,000 cycles.

When monitoring the change in temperature at the centre of the shaft of the opposing part, it is noted that this temperature increased up to nearly 50° C., or even 60° C. with the known bearing, the temperature remained below 40° C. with a bearing according to the invention; this clearly reflects that the energy to be dissipated with a bearing according to the invention is less than that with a known bearing.

Even so, it is noted that the general wear of the bearing according to the invention is greater than those of the known bearing, while the opposing part shows very little wear; it can however be assumed that this wear is only apparent, reflecting in fact the existence of a phenomenon of crushing of the friction layer under the pressure of the contact applied.

The bearing according to the invention was moreover tested under the following conditions:
Oscillation of the axis of amplitude: 100°.
Projected pressure: 80 MPa.
Average velocity: 8 mm/s
Average PV (pressure×velocity): 0.64 MPa·m/s.
Initial shaft/bearing clearance: between 0.1 and 0.2 mm.
Dimensions of bearing: (Øint 30×Øext 36×Lg 20.
Initial greasing: None
Opposing shaft of the solutions tested: 16 NC 6 case-hardened
Maximum duration of test: 1 month (350,000 cycles)
Temperature varying from 50° C. to 280° C. (surroundings)—it was difficult to maintain the temperature constant during these temperature levels The coefficient of friction appears to remain substantially constant despite the increases to 280° C.

These tests establish that the bearing according to the invention satisfactorily combines a very low temperature coefficient and a good performance at a temperature up to above 250° C., in the range 250° C.-280° C.

The invention claimed is:

1. A self-lubricating composite friction part configured for operation temperatures at least equal to 250° C., comprising:
along a friction surface, a friction layer consisting of a single layer of a woven layer fabric formed of a 2×2 twill having pairs of crossing weft and warp strands all consisting of polytetrafluoroethylene, said fabric being impregnated with a heat-stable resin having a glass transition temperature equal to or greater than 250° C.

2. The self-lubricating composite friction part according to claim 1, wherein the weft strands or the warp strands are formed by short fibres linked to one another.

3. The self-lubricating composite friction part according to claim 1, wherein the fabric has a thickness of at least 0.10 mm.

4. The self-lubricating composite friction part according to claim 3, wherein the fabric has a thickness of at least 0.5 mm.

5. The self-lubricating composite friction part according to claim 1, wherein the weft strands and the warp strands have a count of at least 100 dtex.

6. The self-lubricating composite friction part according to claim 1, wherein the resin is a thermosetting polyimide.

7. The self-lubricating composite friction part according to claim 1, further comprising:
a reinforcing layer bordering the fabric opposite the friction surface, said reinforcing layer being impregnated with a same resin as the fabric.

8. The self-lubricating composite friction part according to claim 1, constituting a bearing.

9. The self-lubricating composite friction part according to claim 1, constituting a guide rail.

10. A method Moth d for the manufacture of a self-lubricating composite friction part according to claim 1, comprising:
forming a friction layer consisting of a single layer of fabric formed by the helical winding of a strip of fabric formed by weft strands and warp strands, all constituted by polytetrafluoroethylene, on a mandrel according to a winding angle such that the strip comes edge-to-edge with itself after each turn; and
impregnating the fabric with a heat-stable resin having a glass transition temperature of at least 250° C.

11. The method according to claim 10, wherein the resin is a thermosetting polyimide.

12. The self-lubricating composite friction part according to claim 2, the fabric has a thickness of at least 0.10 mm.

13. The self-lubricating composite friction part according to claim 2, wherein the weft strands and the warp strands have a count of at least 100 dtex.

14. The self-lubricating composite friction part according to claim 3, wherein the weft strands and the warp strands have a count of at least 100 dtex.

15. The self-lubricating composite friction part according to claim 4, wherein the weft strands and the warp strands have a count of at least 100 dtex.

16. The part according to claim 1, wherein the weft and warp strands are each formed by a single filament formed by polytetrafluoroethylene fibres linked to each other by twisting so that the weft and warp strands have irregular surfaces.

17. A self-lubricating composite friction part configured for operation temperatures at least equal to 250° C., comprising:
along a friction surface, a friction layer consisting of a single layer of a woven layer fabric formed of weft and warp strands all consisting of polytetrafluoroethylene, said fabric being impregnated with a heat-stable resin having a glass transition temperature equal to or greater than 250° C.,
wherein the fabric is a weave formed by crossings of pairs of weft strands and of pairs of warp strands, and
wherein the weft and warp strands are each formed by a single filament formed by polytetrafluoroethylene fibres linked to each other by twisting so that the weft and warp strands have irregular surfaces.

* * * * *